US009601838B2

(12) United States Patent
Itou

(10) Patent No.: US 9,601,838 B2
(45) Date of Patent: Mar. 21, 2017

(54) SPLICE FOR GATHERING ENDS OF ELECTRIC WIRE BUNDLE

(71) Applicant: Sumitomo Wiring Systems, Ltd., Yokkaichi, Mie (JP)

(72) Inventor: Hitoshi Itou, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 14/783,288

(22) PCT Filed: Apr. 7, 2014

(86) PCT No.: PCT/JP2014/060046
§ 371 (c)(1),
(2) Date: Nov. 19, 2015

(87) PCT Pub. No.: WO2014/168098
PCT Pub. Date: Oct. 16, 2014

(65) Prior Publication Data

US 2016/0064833 A1 Mar. 3, 2016

(30) Foreign Application Priority Data

Apr. 10, 2013 (JP) ................................ 2013-081778

(51) Int. Cl.
*H02G 15/04* (2006.01)
*H01R 4/14* (2006.01)
(Continued)

(52) U.S. Cl.
CPC ................ *H01R 4/14* (2013.01); *H01R 4/22* (2013.01); *H01R 43/28* (2013.01); *H01R 4/021* (2013.01)

(58) Field of Classification Search
CPC ............................ H02G 15/04; H02G 15/043
(Continued)

(56) References Cited

U.S. PATENT DOCUMENTS 3,243,211 A * 3/1966 Wetmore ............ B29C 61/0616 138/178
3,582,457 A * 6/1971 Barthell .................. F16L 47/22 138/140
(Continued)

FOREIGN PATENT DOCUMENTS

JP 55-169069 12/1980
JP 1987-198007 9/1987
(Continued)

OTHER PUBLICATIONS

International Search Report dated Jul. 29, 2014, International Application No. PCT/JP2014/060046, filed Apr. 7, 2014.

*Primary Examiner* — Chau N Nguyen
(74) *Attorney, Agent, or Firm* — Dinsmore & Shohl LLP

(57) ABSTRACT

A splice for gathering ends of an electrical wire bundle, capable of maintaining a welded portion at the center in a cap member regardless of the number of wires in the electrical wire bundle; protecting the welded portion from vibrations and impacts; and of being versatile so as to be used in multiple wire bundles. The splice includes: an electrical wire portion (10) having a wire core splice portion (14) in which wire cores (13) are welded together; a cushioning member (20) covering an outer circumferential face of the electrical wire portion (10); a protective cap (30) accommodating an end portion of the electrical wire portion (10) and fixes the electrical wire portion (10) via the wire core splice portion (14); and a cover tape (40) wound around the protective cap (30), a portion of the cushioning member (20) exposed from the protective cap (30), and the electrical wire bundle.

2 Claims, 3 Drawing Sheets

(51) Int. Cl.

| | |
|---|---|
| ***H01R 4/22*** | (2006.01) |
| ***H01R 43/28*** | (2006.01) |
| *H01R 4/02* | (2006.01) |

(58) Field of Classification Search
USPC .................................... 174/74 R, 75 B, 74 A
See application file for complete search history.

(56) References Cited

U.S. PATENT DOCUMENTS

| | | | | |
|---|---|---|---|---|
| 5,151,239 | A * | 9/1992 | King, Jr. .................. | H01R 4/22 174/87 |
| 7,074,077 | B2 * | 7/2006 | Sakaguchi ............... | H01R 4/70 174/76 |
| 7,572,979 | B2 | 8/2009 | Otsuki et al. | |

FOREIGN PATENT DOCUMENTS

| | | | |
|---|---|---|---|
| JP | 09-224324 | | 8/1997 |
| JP | 1998-243539 | | 9/1998 |
| JP | 2002-015784 | A | 8/2000 |
| WO | 2005104302 | A1 | 11/2005 |

* cited by examiner

SPLICE FOR GATHERING ENDS OF ELECTRIC WIRE BUNDLE

CROSS-REFERENCE TO RELATED APPLICATIONS

This application is the U.S. national stage of PCT/JP2014/060046 filed Apr. 7, 2014, which claims priority of Japanese Patent Application 2013-081778 filed Apr. 10, 2013.

FIELD OF THE INVENTION

The present invention relates to a splice for gathering ends of an electrical wire bundle, for connecting electrical wires of a wire harness.

BACKGROUND OF THE INVENTION

Generally, a wire harness for automobiles is constituted by a bundle of a plurality of electrical wires. The electrical wires are complexly connected between a large number of connectors that are connected to respective electrical equipment, and are branched or connected at intermediate splices or splices for gathering ends.

Conventionally, when performing splicing by gathering ends of a plurality of electrical wires, insulating cover members at ends of the electrical wires are peeled off, so that wire cores are exposed, the exposed plurality of wire cores are welded to each other using a resistance welder or an ultrasonic welder, and, thus, a splice portion for gathering ends is formed. Then, in order to protect and insulate the formed splice portion for gathering ends, a protective cap made of insulating resin is placed on the splice portion for gathering ends, and the plurality of electrical wires are fixed in an overlapping manner to a tape winding tongue piece projecting from this protective cap by winding an adhesive tape therearound.

However, according to the above-described conventional structure for protecting a splice for gathering ends, a splice portion for gathering ends of a plurality of electrical wires is fixed to the tape winding tongue piece by winding an adhesive tape therearound, and, thus, the splice portion for gathering ends cannot be maintained at the center in the protective cap, but is fixed in a state of being shifted toward the tape winding tongue piece. Thus, vibrations and impacts applied to the protective cap are easily transmitted to the splice portion for gathering ends inside the cap, and the wire cores may be separated due to damage on the welding of the splice portion for gathering ends depending on the size of the vibrations or impacts applied.

SUMMARY OF THE INVENTION

The present invention was made in order to solve problems described above, and it is an object thereof to provide a splice for gathering ends of an electrical wire bundle, capable of maintaining a welded portion at the center in a cap member regardless of the number of wires in the electrical wire bundle, and of protecting the welded portion from vibrations and impacts applied to the cap member, and having versatility that allows the cap member to be shared (used in multiple settings).

The present invention is directed to a splice for gathering ends of an electrical wire bundle, including: an electrical wire bundle having a welded portion in which wire cores at ends of a plurality of electrical wires are welded to each other in a state where the wire cores are exposed; a cover member having cushioning properties, that covers an outer circumferential face of the electrical wire bundle, including the welded portion; a cap member in the shape of a bottomed cylinder that accommodates an end portion of the electrical wire bundle including the welded portion and part of the cover member, and fixes the electrical wire bundle via the cover member; and a tape member that is wound around the cap member, the remaining portion of the cover member exposed from the cap member, and the electrical wire bundle in one piece.

With this configuration, the splice for gathering ends of an electrical wire bundle according to the present invention can maintain the welded portion without shift at the center in the cap member regardless of the inner diameter of the cap member and the outer diameter of the electrical wire bundle. Accordingly, the cap member can be easily shared, and vibrations and impacts from all directions transmitted to the welded portion can be equalized and reduced.

Furthermore, the splice for gathering ends of an electrical wire bundle according to the present invention is configured such that the cover member is constituted by a band-shaped member, and a gap between an inner face of the cap member and an outer face of the electrical wire bundle is filled by winding the band-shaped member for a necessary number of times.

With this configuration, according to the splice for gathering ends of an electrical wire bundle of the present invention, the cover member can fill all gaps between the cap member and the electrical wire bundle. Accordingly, the welded portion can be fixed in the vicinity of the center in the cap member, and the water infiltration resistance can be improved.

Furthermore, the splice for gathering ends of an electrical wire bundle according to the present invention may be configured such that the band-shaped member has, on a face thereof on the inner side for winding, an adhesive layer.

With this configuration, according to the splice for gathering ends of an electrical wire bundle of the present invention, when accommodating the welded portion into the cap member, the wound cover member can be prevented from coming off the electrical wire bundle. Accordingly, a splice structure that can be more easily assembled can be obtained.

The present invention can provide a splice for gathering ends of an electrical wire bundle, capable of maintaining a welded portion at the center in a cap member regardless of the number of wires in the electrical wire bundle, and of protecting the welded portion from vibrations and impacts applied to the cap member, and having versatility that allows the cap member to be shared.

DETAILED DESCRIPTION OF THE PREFERRED EMBODIMENT

Hereinafter, an embodiment of the present invention will be described with reference to the drawings.

Figure 1:
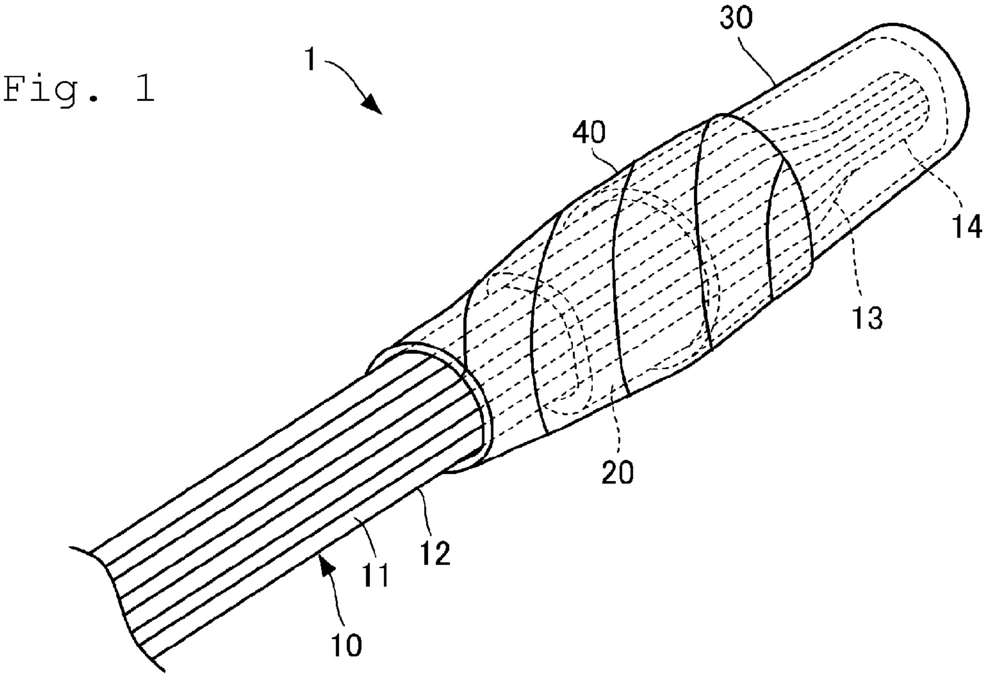
FIG. 1 is a partially see-through perspective view showing the structure of a splice for gathering ends according to an embodiment of the present invention.

FIG. 1 shows a splice 1 for gathering ends according to this embodiment. This drawing shows a partially see-through view of the splice 1 for gathering ends.

In FIG. 1, the splice 1 for gathering ends includes an electrical wire portion 10, a cushioning member 20, a protective cap 30, and a cover tape 40. The electrical wire portion 10 constitutes an electrical wire bundle of the present invention. The cushioning member 20 constitutes a cover member of the present invention. The protective cap 30 constitutes a cap member of the present invention, and the cover tape 40 constitutes a tape member of the present invention.

The electrical wire portion 10 is constituted by a bundle of a plurality of electrical wires 11. In the electrical wire portion 10, a wire core splice portion 14 is formed by welding wire cores 13 at ends of the electrical wires 11 from which insulating cover members 12 have been peeled off, using a resistance welder, an ultrasonic welder, or the like. The wire core splice portion 14 constitutes a welded portion of the present invention.

The cushioning member 20 is formed by winding, for a necessary number of times, a band-shaped member having a predetermined thickness and a predetermined width around end portions of the insulating cover members 12, including the wire core splice portion 14. If the number of winding times is adjusted, that is, if the length in a winding direction orthogonal to the axial direction along the electrical wire portion 10 is adjusted according to a difference between the outer diameter of the electrical wire portion 10 and the inner diameter of the protective cap 30, the wire core splice portion 14 can be easily fixed in the vicinity of the center in the protective cap 30 regardless of the thickness of the electrical wire portion 10.

The cushioning member 20, for example, is shown illustratively as a band-shaped member made of resin such as urethane foam. Accordingly, the band-shaped member has cushioning properties and durability for absorbing vibrations and impacts.

The band-shaped member forming the cushioning member 20 has, on its face on the inner side for winding, an adhesive layer 21 made of a double-faced tape, an adhesive, or the like.

The cushioning member 20 is set so as to have a length in the axial direction longer than that of the protective cap 30. That is to say, the cushioning member 20 is partially exposed from the protective cap 30 when accommodated in the protective cap 30.

The protective cap 30 is made of insulating resin in order to protect and insulate the wire core splice portion 14, and accommodate the wire core splice portion 14 together with the cushioning member 20. The protective cap 30 is in the shape of a simple bottomed cylinder having a flat ring-like opening, without a conventional tape winding tongue piece or the like. Accordingly, the manufacture of such caps can be simplified, and the cost thereof can be lowered.

The cover tape 40 is, for example, an insulating tape that is wound around the outer faces of the protective cap 30, part of the cushioning member 20 exposed from the protective cap 30, and part of the electrical wire portion 10. The cover tape 40 is provided mainly in order to fix the protective cap 30 and the like in one piece.

Water infiltration to the wire core splice portion 14 is prevented better relative to the prior art construction because the cover tape 40 is wound around the protective cap 30, the cushioning member 20, and the electrical wire portion 10 in one piece, and the cushioning member 20 is inserted in the protective cap 30.

Figure 2A:
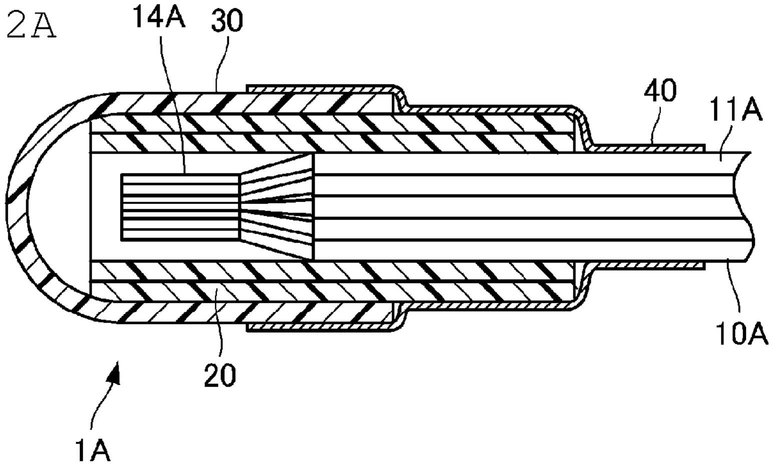
FIG. 2A is a cross-sectional view showing a cross-sectional structure of the splice for gathering ends according to the embodiment of the present invention, in the case where an electrical wire portion is thick.
Figure 2B:
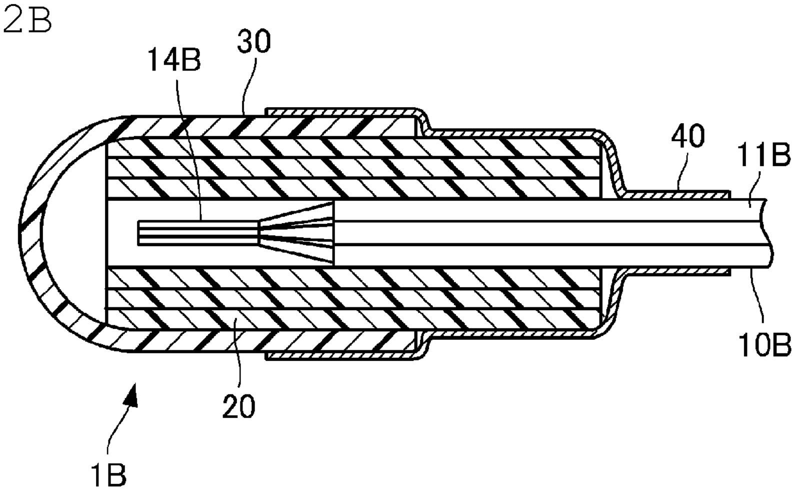
FIG. 2B is a cross-sectional view showing a cross-sectional structure of the splice for gathering ends according to the embodiment of the present invention, in the case where an electrical wire portion is thin.

FIGS. 2A and 2B show cross-sections along the axial direction of the splice 1 for gathering ends shown in FIG. 1. FIG. 2A shows a cross-sectional view of a splice 1A for gathering ends of the case where an electrical wire portion 10A has a large bundle diameter. FIG. 2B shows a cross-sectional view of a splice 1B for gathering ends as an example of the case where an electrical wire portion 10B has a small bundle diameter. FIGS. 2A and 2B show an example of the case where the cushioning member 20 has the same thickness.

In the case of the splice 1A for gathering ends, for a large number of electrical wires and a large bundle diameter as in the electrical wire portion 10A, the number of times that the cushioning member 20 has to be wound is twice, for example, as shown in FIG. 2A. On the other hand, in the case of the splice 1B for gathering ends, for a small number of electrical wires and a small bundle diameter as in the electrical wire portion 10B, the number of times that the cushioning member 20 has to be wound is three times, for example, as shown in FIG. 2B.

If the length of the cushioning member 20 that is to be wound is adjusted according to the outer diameters of the electrical wire portions 10A and 10B in this manner, the protective cap 30 having the same inner diameter can be easily shared (used in multiple settings) regardless of the outer diameters of the electrical wire portions 10A and 10B.

Especially, even in the case of the electrical wire portion 10B having a small outer diameter, the wire core splice portion 14B can be fixed without shift in the vicinity of the center in the protective cap 30. Accordingly, vibrations, impacts, and the like applied to the protective cap 30 can be mitigated uniformly in all directions, so that the problem of being susceptible to vibrations, impacts, and the like from a certain direction can be solved.

Note that similar effects can be expected by adjusting the thickness of the cushioning member 20 instead of the length of the cushioning member 20. That is to say, when sharing the protective cap 30, the cushioning member 20 is made thinner in the case of the electrical wire portion 10A having a large outer diameter, and the cushioning member 20 is made thicker in the case of the electrical wire portion 10B having a small outer diameter, so that the number of times that the cushioning member 20 has to be wound can be the same for the electrical wire portions 10A and 10B having different outer diameters.

Next, the procedure for assembling the splice 1 for gathering ends according to this embodiment will be described.

Figure 3A:
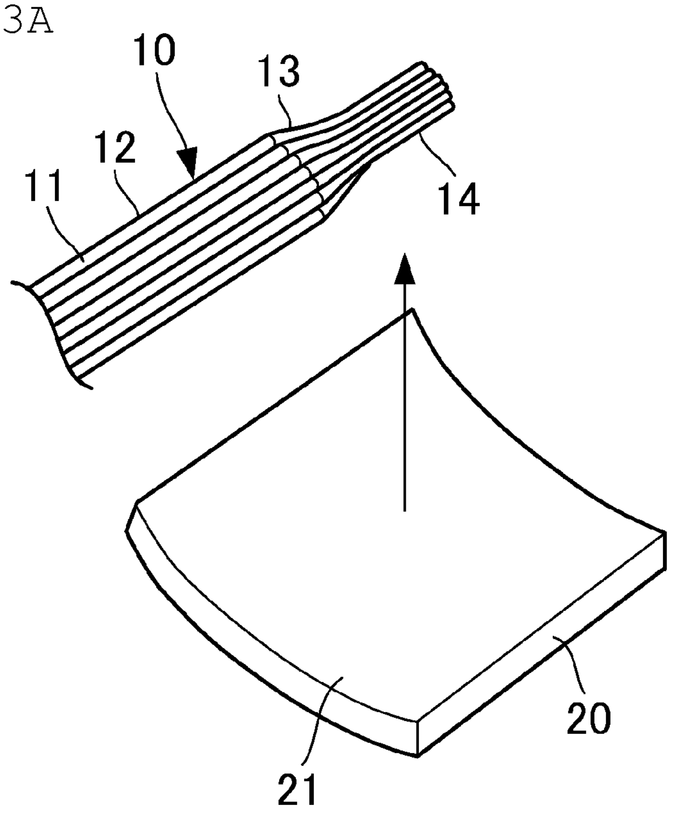
FIG. 3A is a view showing a process for winding a band-shaped member around the electrical wire portion, in the assembly procedure of the splice for gathering ends according to the embodiment of the present invention.

As shown in FIG. 3A, when performing splicing by gathering ends of the plurality of electrical wires 11, the insulating cover members 12 at ends of the electrical wires 11 in the electrical wire portion 10 are cut off, so that the wire cores 13 are exposed. The exposed wire cores 13 are welded to each other using a resistance welder, an ultrasonic welder, or the like, so that the wire core splice portion 14 is formed.

Then, a band-shaped member having a predetermined thickness and a predetermined width is wound in a rolled manner around the outer circumference of the electrical wire portion 10, including the thus formed wire core splice portion 14, to form the cushioning member 20 having a predetermined size. At that time, this predetermined size of the cushioning member 20, that is, the thickness and the length in the winding direction of the cushioning member 20 are determined according to a difference between the outer diameter of the electrical wire portion 10 and the inner diameter of the protective cap 30.

Figure 3B:
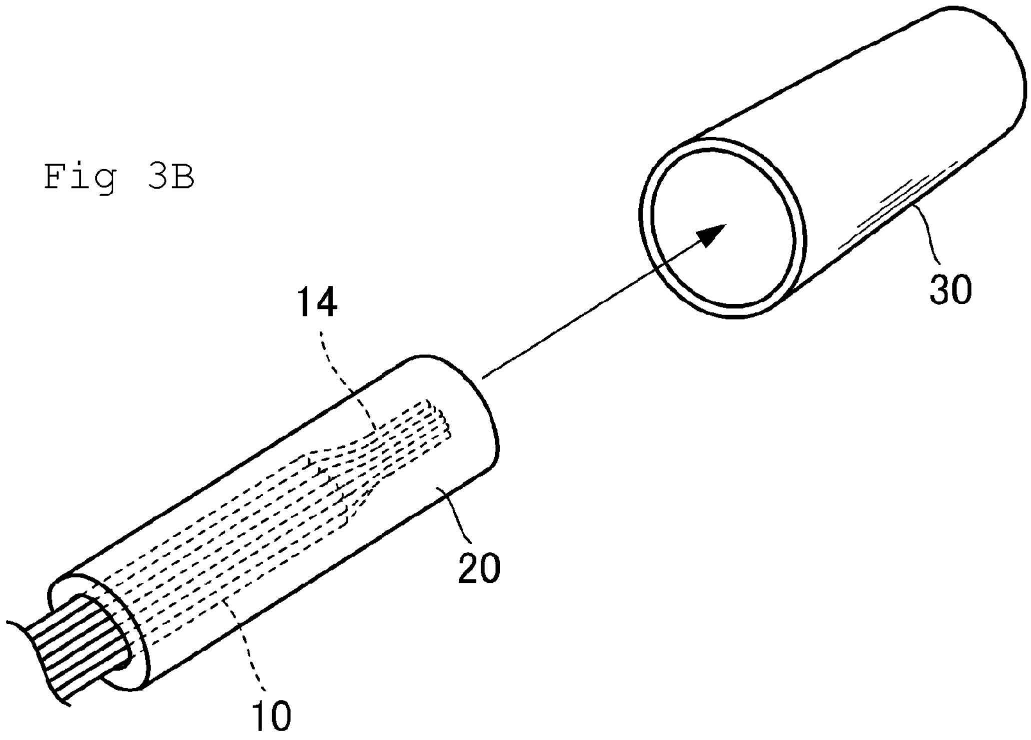
FIG. 3B is a view showing a process for inserting the electrical wire portion into a protective cap, in the assembly procedure of the splice for gathering ends according to the embodiment of the present invention.

Next, as shown in FIG. 3B, the electrical wire portion 10 in the state where the cushioning member 20 is wound therearound is inserted into the protective cap 30, and is pushed until the leading end of the electrical wire portion 10 reaches a deep portion in the protective cap 30. Accordingly, the cushioning member is in close contact with the inner face of the protective cap 30, so that the wire core splice portion 14 can be fixed in the vicinity of the center in the protective cap 30, and the protective cap 30 and the cushioning member 20 can prevent the wire core splice portion 14 from vibrations, impacts, water infiltration, and the like.

At that time, if the cushioning member 20 is formed by winding a band-shaped member having the adhesive layer 21, even when the outer diameter dimension of the electrical wire portion 10 around which the cushioning member 20 is formed is slightly larger than the inner diameter of the protective cap 30, the cushioning member 20 can be prevented from coming off when inserting the electrical wire portion 10 into the protective cap 30, and, thus, a splice structure that can be more easily assembled can be obtained.

Subsequently, an adhesive tape is wound in order to fix the protective cap 30, the cushioning member 20 exposed from the protective cap 30, and the electrical wire portion 10 together, so that the cover tape 40 shown in FIG. 1 is formed. Thus, the splice 1 for gathering ends has been assembled.

As described above, according to the splice 1 for gathering ends of this embodiment, the cushioning member 20 is formed by winding a cushioning material around the wire core splice portion 14, and the wire core splice portion 14 is accommodated together with this cushioning member 20 in the protective cap 30. Thus, the wire core splice portion 14 can be maintained in a fixed state without shift at the center in the protective cap 30, regardless of the size of the outer diameter of the electrical wire portion 10. Accordingly, vibrations and impacts applied to the protective cap 30 are less often transmitted to the wire core splice portion 14, and the protective cap 30 can be easily shared.

Furthermore, according to the splice 1 for gathering ends of this embodiment, the cushioning member 20 fills all gaps between the protective cap 30 and the electrical wire portion 10, and the cover tape 40 is wound around the protective cap 30 and the electrical wire portion 10 in one piece. Thus, the water infiltration resistance can be improved.

Furthermore, according to the splice 1 for gathering ends of this embodiment, if the cushioning member 20 is provided with the adhesive layer 21, the wound cushioning member 20 can be prevented from coming off the electrical wire portion 10, and, thus, a splice structure that can be more easily assembled can be obtained.

Especially compared with the case in which the water infiltration resistance is improved by filling the cap with fillers, according to the splice 1 for gathering ends of this embodiment, there is no need to wait for the fillers to be hardened by drying, and shift of the wire core splice portion before the fillers are hardened by drying can be suppressed.

Note that the cushioning member 20 is not limited to a member that is to be wound, and, for example it may be in the shape of a bag that wraps the wire core splice portion 14, a cylinder, or the like.

As described above, the splice for gathering ends of an electrical wire bundle according to the present invention has effects that vibrations and impacts applied to the cap member are less often transmitted to the welded portion, and, even in the case where the cap member is shared, the welded portion can be protected from vibrations and impacts regardless of the number of wires in an electrical wire bundle, and, thus, this splice for gathering ends is generally useful as a splice for gathering ends of an electrical wire bundle, for connecting electrical wires of a wire harness.

The invention claimed is:

1. A splice for gathering ends of an electrical wire bundle, comprising:

an electrical wire bundle having a welded portion in which wire cores at ends of a plurality of electrical wires are welded to each other in a state where the wire cores are exposed;

a cover member having cushioning properties, the cover member covering an outer circumferential face at an end portion of the electrical wire bundle, including the welded portion, wherein the cover member is constituted by a band-shaped member;

a cap member in the shape of a bottomed cylinder that accommodates an end portion of the electrical wire bundle including the welded portion and part of the cover member in a direction along a length of the cover member, and fixes the electrical wire bundle via the cover member, wherein a gap between an inner face of the cap member and an outer face of the electrical wire bundle is filled by winding the band-shaped member for a necessary number of times; and a tape member that is wound around the cap member, a remaining portion of the cover member, in a direction along the length of the cover member, being exposed from the cap member, and the electrical wire bundle in one piece.

2. The splice for gathering ends of an electrical wire bundle, according to claim 1, wherein the band-shaped member has, on a face thereof on the inner side for winding, an adhesive layer.

* * * * *